United States Patent [19]

Shabram, Jr. et al.

[11] Patent Number: 4,757,893
[45] Date of Patent: Jul. 19, 1988

[54] APPARATUS FOR POSITIVELY SPACING ATTACHED DEVICES ALONG A MOVING TIMING CHAIN

[76] Inventors: Lyle F. Shabram, Jr., 71 Rancho Rd., Carmel Valley, Calif. 93924; Lyle F. Shabram, Sr., 25400 Telarana Way, Carmel, Calif. 93923

[21] Appl. No.: 34,680
[22] Filed: Apr. 6, 1987
[51] Int. Cl.⁴ ............................................. B65G 35/00
[52] U.S. Cl. ............................. 198/474.1; 198/803.2; 104/172.3
[58] Field of Search ............... 198/803.2, 465.3, 474.1, 198/795, 803.01, 465.1, 465.2, 779; 104/165, 172.3

[56] References Cited

U.S. PATENT DOCUMENTS

| | | | |
|---|---|---|---|
| 1,299,184 | 4/1919 | Hover | 198/803.01 |
| 3,340,776 | 9/1967 | Shabram | 493/189 X |
| 3,474,739 | 10/1969 | Van Brakel | 104/172.3 |
| 3,630,502 | 12/1971 | Schmidt | 198/795 X |
| 4,608,797 | 9/1986 | Shabram, Jr. et al. | 53/504 |

FOREIGN PATENT DOCUMENTS 0190950  8/1986  European Pat. Off. ......... 198/803.2

*Primary Examiner*—Joseph E. Valenza
*Assistant Examiner*—Jonathan D. Holmes
*Attorney, Agent, or Firm*—Rosenblum, Parish & Bacigalupi

[57] ABSTRACT

An apparatus for driving and positively spacing attachments along a moving timing chain is disclosed, consisting of at least three chains or belts and means for driving the chains or belts at different speeds and/or directions relative to each other. Attachment carrying lugs are positively held between a first and second chain for a determined distance over a path defined by the first chain, an then released by the second chain to subsequently move into positive engagement between the first chain and a third chain. The speeds and directions of the chains determine the spacing of the lugs and associated attachments.

19 Claims, 4 Drawing Sheets

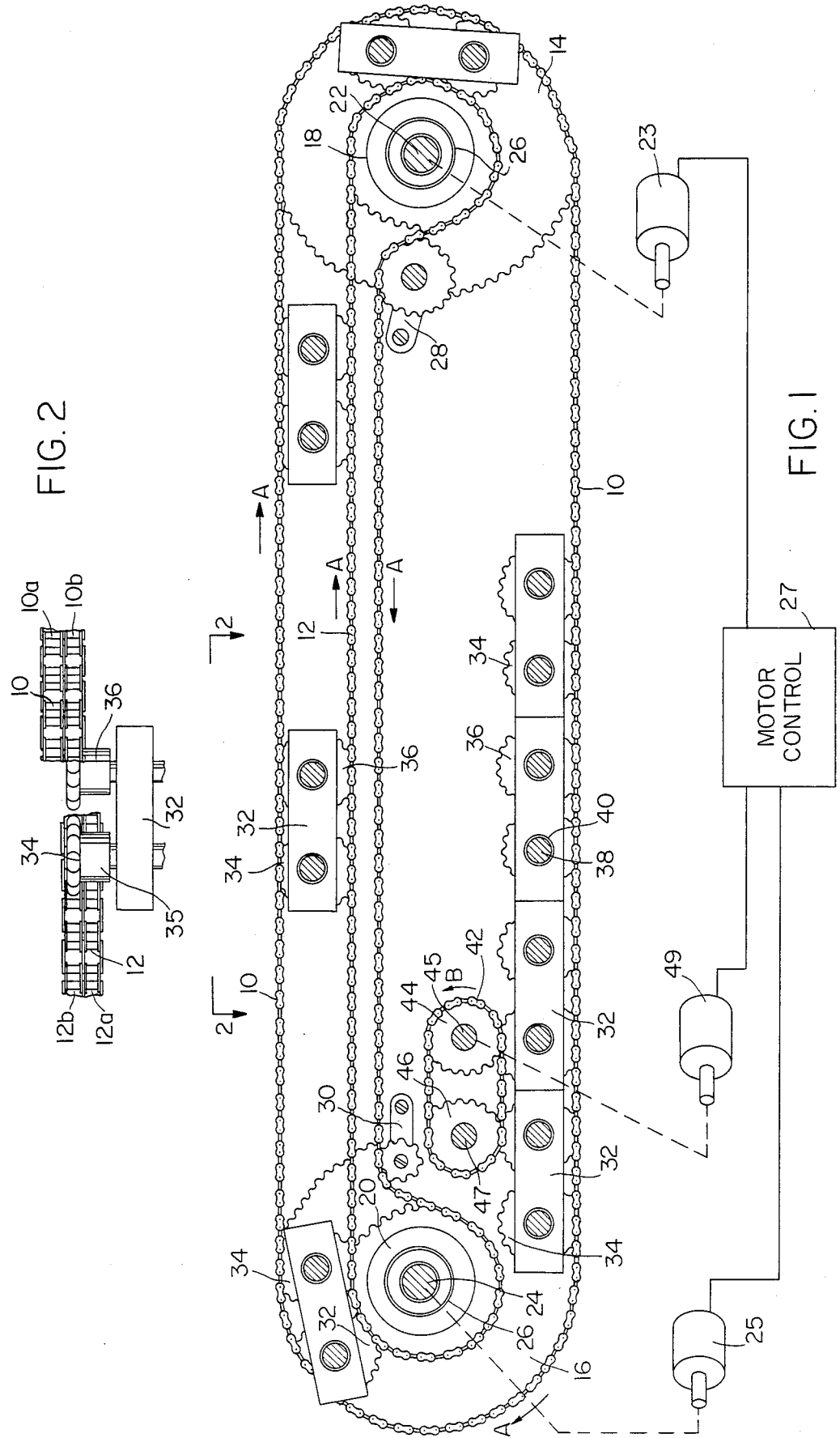

APPARATUS FOR POSITIVELY SPACING ATTACHED DEVICES ALONG A MOVING TIMING CHAIN

BACKGROUND OF THE INVENTION

1. Field of the Invention

This invention relates generally to an apparatus for driving and dynamically spacing attached devices along a timing chain or belt. The invention specifically relates to an apparatus in which the ratio of movement of three or more chains or belts differentially controls the motion and spacing of a series of attachments, and positively maintains the spacing until the attachments are released from driving engagement with the chain.

2. Description of the Prior Art

Conveyers, packaging equipment, and other mechanical apparatus used in the handling of moving products require accurate spacing of lugs, sealing bars, and other operational attachments. The change in spacing of such devices generally requires long change-over time from one product size to another.

Some equipment allows variable spacing along a belt or chain where the lugs are held moveable on the chain or belt and released by mechanical means. For example, see U.S. Pat. No. 3,340,776. The prior art of attachment spacing also teaches two or more apparatuses to drive the same lug, bar, or attachment, as in the packaging machine and sealing bars of U.S. Pat. No. 4,608,797.

The prior art does not teach the use of three or more chains to permit variable spacing of chain attachments.

SUMMARY OF THE PRESENT INVENTION

It is an object of the invention to provide an attachment spacing apparatus for a moving timing chain wherein the spacing may be quickly changed from one spacing increment to another without interruption of the moving chain.

Another object of the present invention is to provide an apparatus for releasing the attachments from a positively held, immovable or controlled state along the chain to positively held, movable states at incremental distances along the chain.

It is also an object of this invention to provide an apparatus for spacing attachments along a series of parallel chains, the series of chains and attachment spacing being controlled by common drive shafts and drive means.

It is a further object of this invention to provide an apparatus that allows spacing of lugs attached to two or more parallel chains, ensuring that the ends of the lugs move in unison.

These and other objects are achieved according to the present invention, which in a preferred embodiment consists of three chains and means for driving at least two of the chains at different speeds.

Lugs or other attachments are in continuous contact with a first chain throughout their movement along that chain's circuit. For some portion of the journey of the lugs around the chain's circuit, the lugs come into contact with a second chain and a third chain. The second chain serves with the first chain to positively drive lugs that are held therebetween. At some point, the second chain no longer contacts the lugs, and the lugs coast along the first chain, i.e., move with the first chain without contact with another chain. The third chain contacts the coasting lugs at a point farther along the course of the first chain, causing the coasting lugs to again be positively engaged. The motion of the third chain serves to accumulate the lugs and to then determine spacing of the lugs by holding and then periodically releasing the lugs to again be positively driven by the first and second chains.

Independent control of the speed and direction of the three chains permits lugs to be driven in spaced apart relationship as is necessary for a task. Since the relative speeds and directions of the chains can be varied, a change in the spacing of lugs can be accomplished without a time-consuming change of mechanical components. In addition, the invention obviates the need for a variety of parts or apparatus to accomplish different lug spacings.

BRIEF DESCRIPTION OF THE DRAWINGS

FIG. 1 is a side elevational view illustrating a preferred embodiment of the present invention;

FIG. 2 is a partial cutaway top view of two chains and a lug as viewed from along the line 2—2 of FIG. 1;

DESCRIPTION OF THE PREFERRED EMBODIMENTS

Figure 7:
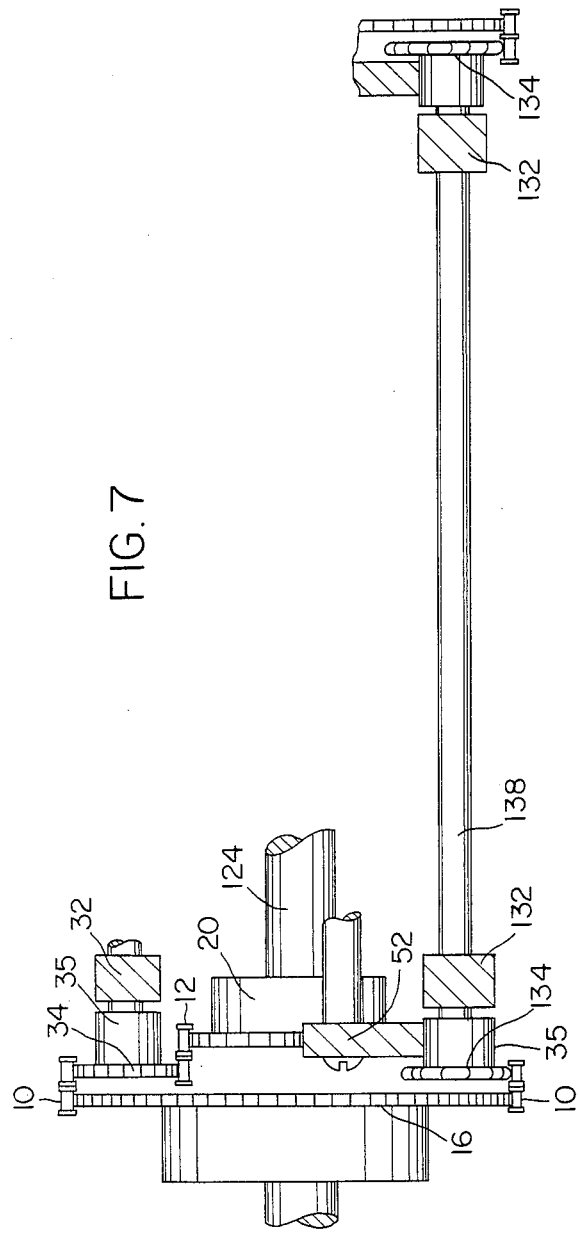
FIG. 7 is a partial end view of an apparatus in accordance with the present invention having two lug spacing assemblies.

FIG. 1 shows an apparatus in accordance with the present invention for driving and positively spacing lugs along a moving timing chain. A first chain 10 is mounted on sprockets 14 and 16, while a second chain 12 is mounted on sprockets 18 and 20. Sprocket 14 is rigidly attached to a powered shaft 22 and sprocket 16 is bearing mounted to a shaft 24. Sprockets 18 and 20 are respectively mounted on shafts 22 and 24 in similar fashion except that sprocket 18 is bearing mounted on shaft 22 and sprocket 20 is rigidly affixed to the driven shaft 24. Idler assemblies 28 and 30 maintain necessary tension in chain 12. Shafts 22 and 24 are powered separately by conventional means such as motors 23 and 25 under control of a motor control means 27. This arrangement allows chains 10 and 12 to be driven in unison or at selectable differential speeds along the linear portions of their respective paths. The effective outer diameters of sprockets 14 and 18, and 16 and 20, are selected so that their difference in radius is equal to the effective outer diameter of each of a plurality of idler sprockets 34 and 36.

Chains 10 and 12 are preferably driven in direction A, such that a plurality of chain attachments, such as lugs 32, may be carried therebetween and caused to accumulate (as described below) near sprockets 16 and 20 on shaft 24 as they are carried from right to left, as depicted, on the bottom portion of chain 10. Each lug 32 is equipped with a forward idler sprocket 34 and a rear idler sprocket 36, each of which rotates freely on its shaft 38 in oilite bushings 40 or similar bearings. The use of idler sprocket pairs 34 and 36 keeps lugs 32 from uncontrollably rotating or pivoting with respect to the chains.

As FIG. 1 shows, after being engaged thereby and carried for a distance along the path of chains 10 and 12, sprockets 34 and 36 continue to engage both chains 10 and 12. If chains 10 and 12 have the same linear speeds, during the linear portion of the engagement of a lug 32 with chains 10 and 12, sprockets 34 and 36 are unable to rotate with respect to chains 10 and 12. This causes lugs 32 to remain fixed in position with respect to chains 10 and 12 and other spaced lugs 32 being similarly driven. However, if chains 10 and 12 are driven at different linear speeds, it will be appreciated that the sprockets 34 and 36 will rotate and cause the lugs to move at a speed equal to the average of the two chain speeds. Those skilled in the art will recognize that if the two chains 10 and 12 are driven in opposite directions at equal speed the lugs carried thereby will remain stationary.

Lugs 32 can have many different configurations. In the figures, the lugs are shown as rectangular blocks used to space sprockets 34 and 36 a set distance apart. Although not shown these blocks also serve as means to which a driven operative component of a particular system may be attached. Alternatively, the apparatus could operate with only a single sprocket or wheel on each lug 32. In fact, the apparatus will operate with only the sprockets and no lugs, provided the sprockets have an attachment to maintain separation when they are collected together.

The lugs 32 and their idler sprockets 34 and 36 are released from engagement with chain 12 but remain engaged to chain 10 after they pass beneath sprocket 18 and are supported solely by chain 10. In this condition, lug 32 may move forward, backward, or coast with respect to chain 10 through the free rotation of sprockets 34 and 36. Sprockets 34 and 36 are held engaged with chain 10 by any of a number of conventional methods, such as gravity, L-clips, friction, or guide tracks. Once freed from the engagement of chain 12, lugs 32 progress forward (leftwardly) on chain 10 (unless restrained), until they encounter a preceding lug, at which point sprockets 34 and 36 will roll with respect to chain 10.

A third chain assembly, comprising a third chain 42 and sprockets 44 and 46, is positioned along the path of first chain 10 and spaced thereabove as indicated so that the lower portion of chain 42 also engages sprockets 34 and 36 for some portion of the journey of lug 32 along the path of chain 10. Sprocket 44 is rigidly attached to a powered shaft 45, and sprocket 46 is bearing mounted to a shaft 47. Shaft 45 is powered by conventional means, such as motor 49, under control of motor control means 27.

When the forward idler sprocket 34 of a lug 32 encounters chain 42, the movement of that lug along the path of chain 10 is controlled by the speed and direction of motion of chain 42 relative to chain 10. Sufficient lugs 32 are used to permit accumulation of the lugs behind the point where the lugs contact chain 42. If chain 42 is kept at rest (not moving), the forward progress of chain 10 will cause idler sprockets 34 and 36 to roll between chains 10 and 42, causing lugs 32 to move at one-half the speed of chain 10. If third chain 42 moves in direction B at an equal (but opposite) speed to first chain 10, idler sprockets 34 and 36 will be caused to rotate in the clockwise direction and cause lug 32 to remain in position (unmoved with respect to FIG. 1).

The chains used in the preferred embodiment are double chain, allowing side-by-side engagement of the various sprockets. FIG. 2 shows a top view of chains 10 and 12 as engaged by the idler sprockets 34 and 36 of a lug 32. It will be appreciated that chain side 10a will engage sprockets 14 and 16 while chain side 12a will engage sprockets 18 and 20, and 44 and 46. Chain sides 10b and 12b will be engaged by sprockets 34 and 36.

With reference again to FIG. 1, if chain 10 progresses some counted number of links in direction A, while chain 42 progresses some other number of links in direction B at a linear speed less than that of chain 10, idler sprockets 34 and 36 will rotate at a faster rate than sprockets 44 and 46, and will thus move the associated lug 32 leftwardly and out of engagement with chain 42. As the rear sprocket 36 of a lug 32 leaves contact with chain 42, the forward sprocket 34 contacts chain 12 and causes the lug to be positively driven between chains 10 and 12 in direction A, maintaining the spacing of lugs that was initially established by the relative motions of chains 10 and 42.

If chains 10 and 12 move at the same linear speed, their angular motion around sprockets 16 and 20 (also around sprockets 14 and 18) will not be equal. Chain 12 will thus pass through the circular portion of its path faster than will chain 10, since sprocket 20 is smaller than sprocket 16. This will cause sprockets 34 and 36 to rotate slowly until the lug reaches the top of sprockets 16 and 20 after which rotation will stop and the spacing of lugs 32 that has been established will be maintained.

Figure 3:
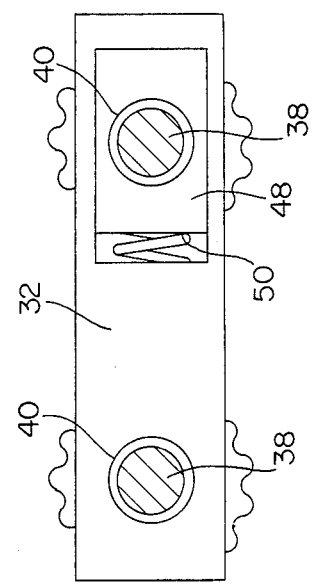
FIG. 3 shows a side elevational view of a lug.

In the embodiment of FIG. 1, the distance between the centers of sprockets 34 and 36 should be consistent with the chain pitch (distance between chain pins or rollers). The centers of sprockets 34 and 36 will tend to close together while moving about the radius of sprockets 14 and 18 or 16 and 20. For chain sprockets with smaller radii, it may be necessary to employ a lug 32 such as shown in FIG. 3, with a slide block 48 and spring 50, allowing sprockets 34 and 36 to collapse toward each other. For chain sprockets with larger radii, the tolerance between idler sprocket teeth and chain links is sufficient to ignore this detail.

The ratio of movement between chains 10 and 42 can be controlled by a number of conventional methods, such as gearing, chain and sprockets, or separate power sources (separate motors) as depicted in FIG. 1. The use of a positive infinitely variable gearing system permits adjustment to precise ratios. In addition, electronic controls and encoder wheels, such as those disclosed in U.S. Pat. No. 4,608,797, can be employed to allow precise movements of chain 42 with respect to chain 10. Such controls also allow deliberate changes in spacing from one lug to the next.

Imprecise motion between chains 10 and 42 can result in poor engagement of idler sprocket 34 with chain 12 at sprocket 20. Therefore, it may be desirable to cause chain 42 to progress in intermittent motion in direction B, stopping once for each lug 32, with the chain links properly aligned, allowing rear sprocket 36 to roll from engagement of chain 42, thereby causing front sprocket 34 to be aligned with the links of chain 12.

Proper control of the motion between chain 10 and chain 42 will result in specific spacing of lugs along the chain. In the embodiment illustrated in FIG. 1, lugs 32 can be spaced at increments divisible by one-half the pitch of the chain.

Although it is preferable when chain 42 is moved intermittently that chain 42 move at a linear speed equal but opposite to chain 10, this is not necessary as long as chain 42 does not move so much slower or faster than chain 10 that sprockets 34 and 36 escape the engagement of chain 42 before chain 42 has been stopped to "eject" the lug. Aside from these "too fast" or "too slow" limitations, idler sprockets 34 and 36 will automatically roll to the proper link of chain 12 after chain 42 has been stopped, regardless of the speed of chain 42 during spacing of the lugs 32.

The apparatus taught by this disclosure can also be arranged in other configurations. The important feature for achieving adjustable spacing between lugs 32 is that at least two of the chains 10, 12, and 42 can be varied relatively in speed and direction.

In the configuration of FIG. 1, chain 42 is driven either continuously or intermittently in direction B, stalling or driving the lugs backward relative to chain 10. This motion creates the required spacing between lugs 32. Alternatively, chain 42 can be powered in direction A. Moving chain 42 in direction A at a linear speed slower than chain 10 creates small spaces between lugs 32. In this configuration, chains 10 and 12 move in unison either at the same linear speed (which requires that sprockets 18 and 20 be powered separately from shafts 22 and 24) or at different surface speeds.

Figure 4:
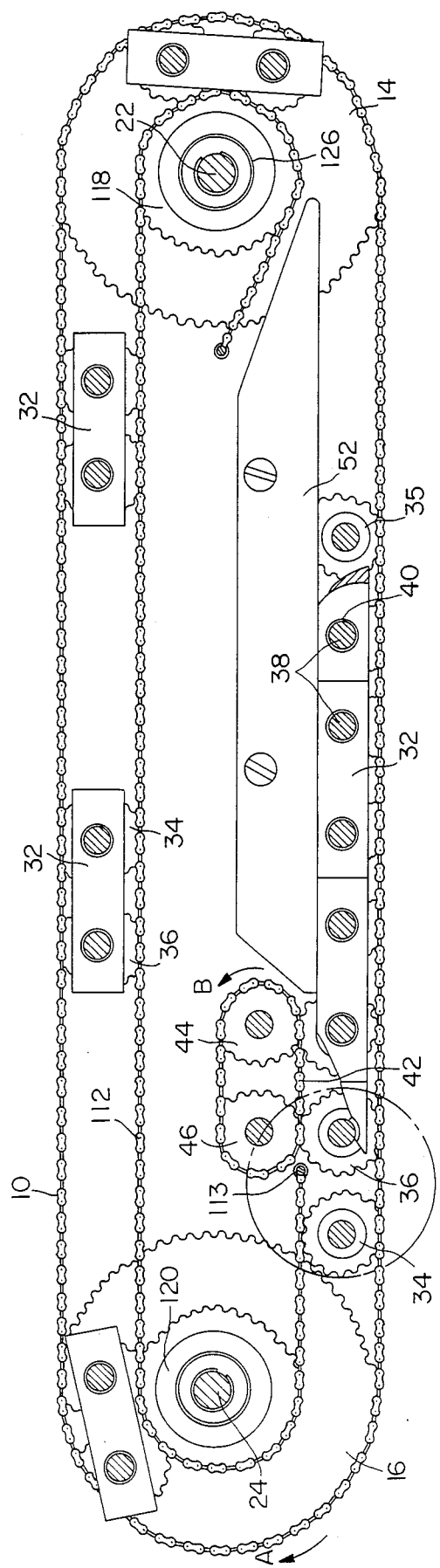
FIG. 4 is a side elevational view similar to FIG. 1, showing an alternative embodiment.
Figure 5:
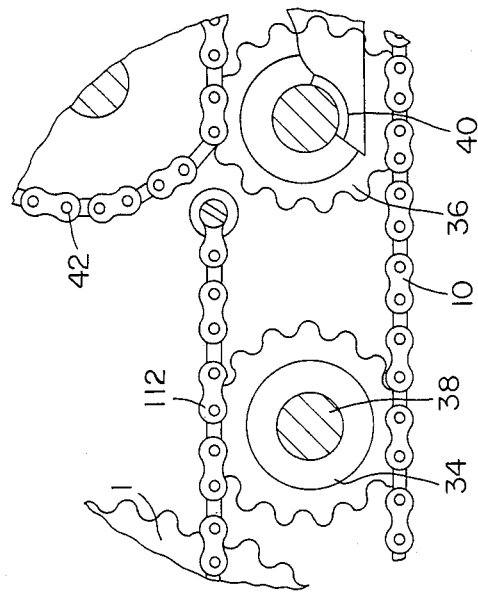
FIG. 5 is an expanded view of the encircled section of FIG. 4.

FIG. 4 shows an alternative configuration, in which chain 112 serves as a stationary rack. In this embodiment, sprockets 118 and 120 do not rotate. An open end 113 of chain 112 can be brought sufficiently close to chain 42 to allow the immediate engagement of the sprockets 34 and 36 with chain 112 as they leave engagement with chain 42. An expanded view of a cutaway portion of FIG. 4 is shown in FIG. 5, illustrating this arrangement. Since chains 112 and 42 are positioned closer to each other than in the embodiment of FIG. 1, a more positive exchange of lug 32 between chains 42 and 112 is achieved because there is no possibility of either sprocket 34 or 36 not engaging the proper link of chain 112 at the proper time. Optimum performance requires that chain 42 be stopped during the exchange. Thus, chain 42 could be powered intermittently, moving the correct number of links to create the spacing and then stopping long enough to allow the exchange. Chain 42 has to stop at relatively exact positions that coincide with the pitch of the chain links and the distance between chains 112 and 42.

FIG. 4 also shows a slide rail 52 used as a means for insuring the constant engagement of sprockets 34 and 36 with chain 10 during the coasting and collecting stages of lugs 32. Slide rail 52 is designed to contact the hubs 35 (FIG. 7) of sprockets 34 and 36. Slide rail 52 is preferably made of or is coated with teflon or similar materials that allow sprockets 34 and 36 to roll freely or to slide relative thereto during the collected or free stages.

Figure 6:
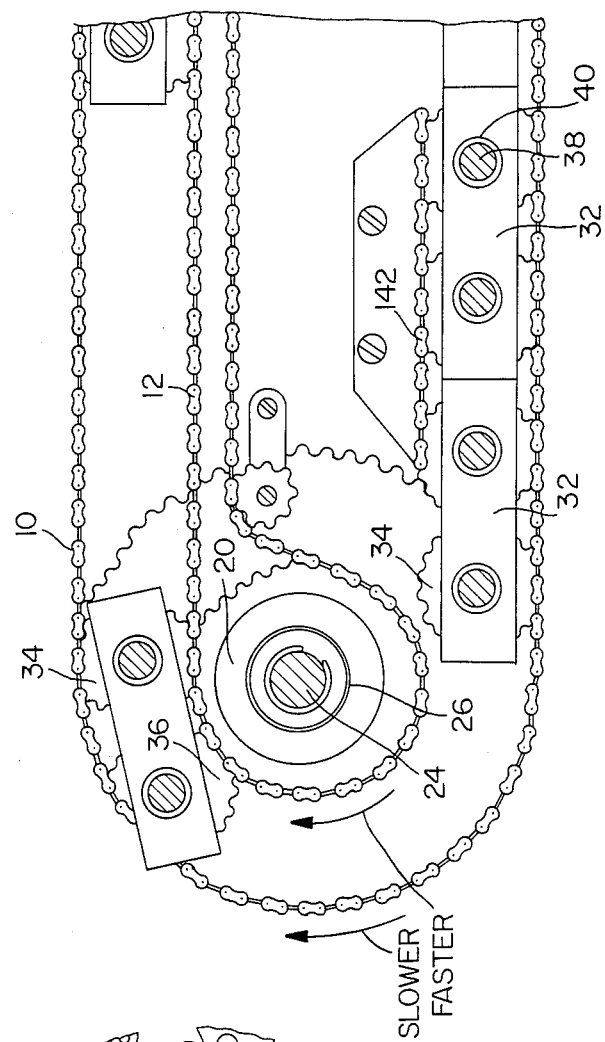
FIG. 6 is a partial side elevational view illustrating certain details of a third embodiment of the invention.

A third configuration is shown in FIG. 6 wherein chain 142 is stationary and causes a slowing and collection of lugs 32 as sprockets 34 and 36 roll across the links thereof. If chain 12 is powered separately from chain 10, an increase of the speed of chain 12 relative to chain 10 creates larger spaces between lugs 32 as they move from engagement with chain 142 to engagement with chain 12. As in the configuration of FIG. 1, rear sprocket 36 must be released from engagement with chain 142 just before engagement of front sprocket 34 with chain 12 in order to ensure proper meshing.

In the embodiments of FIG. 4 and FIG. 6, the inner moveable chain (chain 42 in FIG. 4 and chain 12 in FIG. 6) alternatively can be used as a stationary rack which is intermittently moved during the exchange of lugs 32 between chains 12 and 42. This intermittent motion permits a more precise exchange, as described above for the configuration of FIG. 1. Since chains 112 and 42, and 12 and 142, are closer together in FIG. 4 and FIG. 6, respectively, than are chains 12 and 42 in FIG. 1, more positive engagement of sprockets 34 and 36 with these chains is possible than in the configuration of FIG. 1.

In still another alternative embodiment which is not depicted, chain 10 can be used as a stationary rack, with chain 12 driving the lugs around the path. In such an embodiment, chain 42 could be used as a continuously moving chain, or an intermittently moving chain-but must engage lugs as they are discharged from chain 12, and later drive the lugs back into engagement with claim 12.

Two or more lug-spacing assemblies can be used to move and space a common apparatus (such as sealing bars on a packaging machine). Such results can be achieved by tying the lug spacing assemblies together mechanically as shown in FIG. 7. The use of a relatively long lug shaft 138, with a pair of idler sprockets 134 on parallel chains, ensures that the two ends of the lug 132 move in unison. Alternatively, individual lug spacing and drive assemblies as shown in FIGS. 1, 4, and 6 can be tied together mechanically, such that a series of the assemblies can be operated in parallel, as through common use of a powered shaft 124.

The apparatus is not limited to use of only three chains in a system. If additional chains are added or assemblies of the types illustrated are concatenated, the spacing of attachments can be changed during the course of a lug's journey around the apparatus.

Each of these configurations illustrates an embodiment of the invention. The invention uses three (or more) chains, gear belts, or equivalent drive means, together with means for controlling the ratio of movement between them, to create desired spacing of attachments, and to provide driving power to the lug carried attachments.

Although the present invention can be implemented with means that do not positively engage supporting wheels affixed to the attachments, such as belts, rollers and tracks, the use of a positive drive combination, such as chain and sprocket, or gear and gear belt, ensures the continued and repeated exactness of the positioning of attachments on the chain. The use of such positive drive mechanisms also ensures maintenance of relative positioning of the attachments as they are driven over an intended path.

Whereas, preferred embodiments of the present invention have been described above, it is contemplated that other alternatives and modifications may become apparent to those skilled in the art after having read the above disclosure. It is therefore intended that the appended claims be interpreted as covering all such alternatives and modifications as fall within the true spirit and scope of the invention.

What is claimed is:

1. An apparatus for driving a plurality of devices over a predetermined path and for maintaining a selected spacing therebetween, comprising:
   a plurality of lugs adapted to be attached to said devices, each said lug having at least one sprocket wheel of a predetermined diameter;
   a first chain for drivingly engaging the sprocket wheel of each lug and for defining a closed path along which said lugs may be driven;
   a second chain for engagement with the sprocket wheels of the lugs and having at least a portion thereof disposed to extend parallel to a first portion of said first chain and spaced therefrom a distance equal to said predetermined diameter;

first drive means for driving said first chain relative to said second chain;

a third chain for engagement with the sprocket wheels of the lugs and having at least a portion thereof disposed parallel to a second portion of said first chain and spaced therefrom a distance equal to said predetermined diameter; and second drive means for driving said third chain relative to said first chain;

whereby as said first chain is driven by said first drive means it first causes the sprocket of each lug to advance into engagement with said second chain, whereupon the continued advancement of each lug along said path is determined by the relative motion of said first and second chains until the sprocket of the lug is disengaged from said second chain, whereupon the sprocket of the lug is subsequently driven by said first chain into engagement with said third chain, whereupon the continued advancement of the lug, and its spacing along said path relative to the other lugs, after disengagement with said third chain, is determined by the relative motion of said first and third chains.

2. An apparatus as recited in claim 1 wherein said second chain is fixed in position and has an entry portion disposed proximate to an exit portion of said third chain, and has an exit portion disposed remote from the entry portion of said third chain, whereby upon leaving engagement with said second chain, the lugs are carried by said first chain for a predetermined distance before engaging said third chain.

3. An apparatus as recited in claim 1 wherein said first and second chains are disposed about first and second sprocket pairs each of which includes a first sprocket of relatively large diameter for carrying said first chain and a coaxially disposed second sprocket of relatively small diameter for carrying said second chain.

4. An apparatus as recited in claim 3 wherein said first and second chains are double-wide chains with one portion of the width of each chain engaging one sprocket of each pair of sprockets, the other portions of the widths of said first and second chains being disposed for engagement by the sprocket wheels of said lugs.

5. An apparatus as recited in claim 4 wherein said lugs include a pair of spaced-apart sprocket wheels each of which is adapted to engage said first, second and third chains.

6. An apparatus as recited in claim 3 wherein said first drive means includes a first motor for driving said first chain over said first sprockets, a second motor for driving said second chain over said second sprockets, and control means for controlling the drive speeds of said first and second chains.

7. An apparatus as recited in claim 6 wherein said third chain is formed into an endless loop and is supported by a pair of spaced apart sprocket wheels at least one of which is driven by a third drive means the drive speed of which is controlled by said control means.

8. An apparatus as recited in claim 1 wherein said lugs include a pair of spaced-apart sprocket wheels each of which is adapted to engage said first, second and third chains.

9. An apparatus as recited in claim 8 wherein said first and second chains are double-wide chains with one portion of the width of said first chain being driveably connected to said first drive means, and one portion of said third chain being driveably connected to said second drive means, the other portions of the widths of said first and second chains being disposed for engagement by the sprocket wheels of said lugs.

10. An apparatus as recited in claim 9 wherein said second chain is fixed in position and has an entry portion disposed proximate to an exit portion of said third chain, and has an exit portion disposed remote from the entry portion of said third chain, whereby upon leaving engagement with said second chain, the lugs are carried by said first chain for a predetermined distance before engaging said third chain.

11. An apparatus for driving a plurality of devices over a predetermined path and for maintaining a selected spacing therebetween, comprising:

a plurality of lugs adapted to be attached to said devices, each said lug having at least one sprocket wheel of a predetermined diameter;

a first chain for drivingly engaging the sprocket wheel of each lug and for defining a closed path along which said lugs may be driven;

a second chain for engagement with the sprocket wheels of the lugs and having at least a portion thereof disposed to extend parallel to a first portion of said first chain and spaced therefrom a distance equal to said predetermined diameter;

first drive means for driving said first chain relative to said second chain;

a third chain for engagement with the sprocket wheels of the lugs and having at least a portion thereof disposed parallel to a second portion of said first chain and spaced therefrom a distance equal to said predetermined diameter; and second drive means for driving said second chain relative to said first chain;

whereby as said first chain is driven by said first drive means it first causes the sprocket of each lug to advance into engagement with said second chain, whereupon the continued advancement of each lug along said path is determined by the relative motion of said first and second chains until the sprocket of the lug is disengaged from said second chain, whereupon the sprocket of the lug is subsequently driven by said first chain into engagement with said third chain, whereupon the continued advancement of the lug, and its spacing along said path relative to the other lugs, after disengagement with said third chain, is determined by the relative motion of said first and third chains.

12. An apparatus as recited in claim 11 wherein said third chain is fixed in position and has an entry portion disposed remote from an exit portion of said second chain, and has an exit portion disposed proximate the entry portion of said second chain, whereby upon leaving engagement with said second chain, the lugs are carried by said first chain for a predetermined distance before engaging said third chain.

13. An apparatus as recited in claim 12 wherein said first and second chains are disposed about first and second sprocket pairs each of which includes a first sprocket of relatively large diameter for carrying said first chain and a coaxially disposed second sprocket of relatively small diameter for carrying said second chain.

14. An apparatus as recited in claim 13 wherein said first and second chains are double-wide chains with one portion of the width of each chain engaging one sprocket of each pair of sprockets, the other portions of the widths of said first and second chains being disposed for engagement by the sprocket wheels of said lugs.

15. An apparatus as recited in claim 14 wherein said lugs include a pair of spaced-apart sprocket wheels each of which is adapted to engage said first, second and third chains.

16. An apparatus as recited in claim 11 wherein said first drive means includes a first motor for driving said first chain over said first sprockets, a second motor for driving said second chain over said second sprockets, and control means for controlling the drive speeds of said first and second chains.

17. An apparatus as recited in claim 16 wherein said first and second chains are disposed about first and second sprocket pairs each of which includes a first sprocket of relatively large diameter for carrying said first chain and a coaxially disposed second sprocket of relatively small diameter for carrying said second chain.

18. An apparatus as recited in claim 17 wherein said first and second chains are double-wide chains with one portion of the width of each chain engaging one sprocket of each pair of sprockets, the other portions of the widths of said first and second chains being disposed for engagement by the sprocket wheels of said lugs.

19. An apparatus as recited in claim 18 wherein said lugs include a pair of spaced-apart sprocket wheels each of which is adapted to engage said first, second and third chains.

* * * * *